(12) United States Patent
Lin

(10) Patent No.: US 6,877,887 B2
(45) Date of Patent: Apr. 12, 2005

(54) COLOR-CHANGING ILLUMINATION ASSEMBLY FOR VEHICLE ACCESSORY

(76) Inventor: Rocky Lin, P.O. Box 26-757, Taipei (TW), 106

( * ) Notice: Subject to any disclaimer, the term of this patent is extended or adjusted under 35 U.S.C. 154(b) by 205 days.

(21) Appl. No.: 10/393,038

(22) Filed: Mar. 18, 2003

(65) Prior Publication Data

US 2004/0184277 A1 Sep. 23, 2004

(51) Int. Cl.[7] ............................................. F21W 101/02
(52) U.S. Cl. ........................ 362/487; 362/488; 362/491; 362/494; 362/503; 362/543; 362/510
(58) Field of Search ................................ 362/488, 191, 362/494, 496, 503, 543, 487, 510, 293, 523

(56) References Cited

U.S. PATENT DOCUMENTS

| | | | | |
|---|---|---|---|---|
| 5,900,678 A | * | 5/1999 | Rodgers | ..................... 307/10.1 |
| 5,975,728 A | * | 11/1999 | Weyer | ......................... 362/489 |
| 6,074,078 A | * | 6/2000 | Georgeff et al. | ............. 362/503 |
| 6,536,928 B1 | * | 3/2003 | Hein et al. | ................... 362/464 |
| 6,572,250 B1 | * | 6/2003 | Assinder et al. | ............. 362/494 |
| 6,761,323 B2 | * | 7/2004 | Hsieh | ....................... 239/284.1 |

OTHER PUBLICATIONS

SCION, Issue 03, Winter 2004, "Interior Accent Colors" pp32–33.*
"Cup Holder Illumination" Installation, scion.com, Apr. 02, 2003, pp 1–10.*

* cited by examiner

Primary Examiner—Laura K. Tso

(57) ABSTRACT

A vehicle accessory color-changing illumination assembly includes a control box, a plurality of vehicle accessories and a plurality of light sources. The control box is provided with a control button and a control circuit. Each of the vehicle accessories is assembled on a vehicle body and includes a transparent casing. The light sources are respectively mounted inside the vehicle accessories. The control circuit of the control box is electrically connected to control circuits of the light sources to control simultaneous color changes of the light sources. The vehicle accessories include a external right and left rearview mirrors, a liquid jet nozzle, a gear lever and a interior rearview mirror that simultaneously change their color under the control of the control box to increase warning performance and therefore driving safety. Additionally, it also improves the pleasure of driving.

8 Claims, 3 Drawing Sheets

COLOR-CHANGING ILLUMINATION ASSEMBLY FOR VEHICLE ACCESSORY

BACKGROUND OF THE INVENTION

1. Field of the Invention

The invention relates to an illumination assembly and, more particularly, to a vehicle accessory color-changing illumination assembly which simultaneously changes the colors at the same time for different vehicle accessories.

2. Description of the Related Art

To safely drive a motorized vehicle such as a car, the vehicle is usually provided with a headlight, a direction light and a taillight. In a crowded traffic, the distance between running vehicles is usually shortened, which increases the probability of traffic accidents. On the highway, the vehicles running at a high speed must keep a safety distance from one another. In addition to driving safety, good-taste consumers also demand esthetic aspect of the vehicle and pleasure of driving.

In order to alert other running vehicles and pedestrians on the road, a small light or reflective plate is further mounted on the vehicle to outline the vehicle width.

The small light or reflective plate is usually mounted at a specific location on both sides of the vehicle. The location of the small light or reflective plate rarely increases the warning effect. A reflective strip further may be attached on the body of the car. However, the reflective strip, which restrictedly reflects the surrounding light, may peel off from the vehicle body and impair the aesthetic aspect of the vehicle.

Therefore, there is a need for an illumination assembly that can solve the above problems of the prior art.

SUMMARY OF INVENTION

It is therefore one object of the invention to provide a vehicle accessory color-changing illumination assembly that can increase the warning effect and allows safer driving of the vehicle.

It is another object of the invention to provide a vehicle accessory color-changing illumination assembly that can increase the aesthetic aspect of the vehicle and improves the pleasure of driving.

In order to achieve the above and other objectives, the invention provides a vehicle accessory color-changing illumination assembly that includes a control box and a plurality of light sources. The control box is provided with a control button and a control circuit. Each light source is respectively mounted inside one particular vehicle accessory that is assembled within the vehicle body and respectively includes a transparent casing. A control circuit of the control box is electrically connected to control circuits of the light sources to control simultaneous color changing of the light sources.

The vehicle accessories include, for example, exterior right and left rearview mirrors, a liquid jet nozzle, a gear lever and an interior rearview mirror. Light sources inside the right and left side view mirrors change color at the same time as the light source inside the liquid jet nozzle changes color to emphasize the outline of the vehicle, which helps the driver of the vehicle to keep an optimum safety distance from other vehicles. The control circuit of the control box controls the light sources inside the gear lever and the interior rearview mirror to change their colors simultaneous to the color change of the light sources inside the external right and left rearview mirrors. The vehicle accessory color changing illumination assembly thereby provides a colorful change to the vehicle interior, which increases the pleasure of driving.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
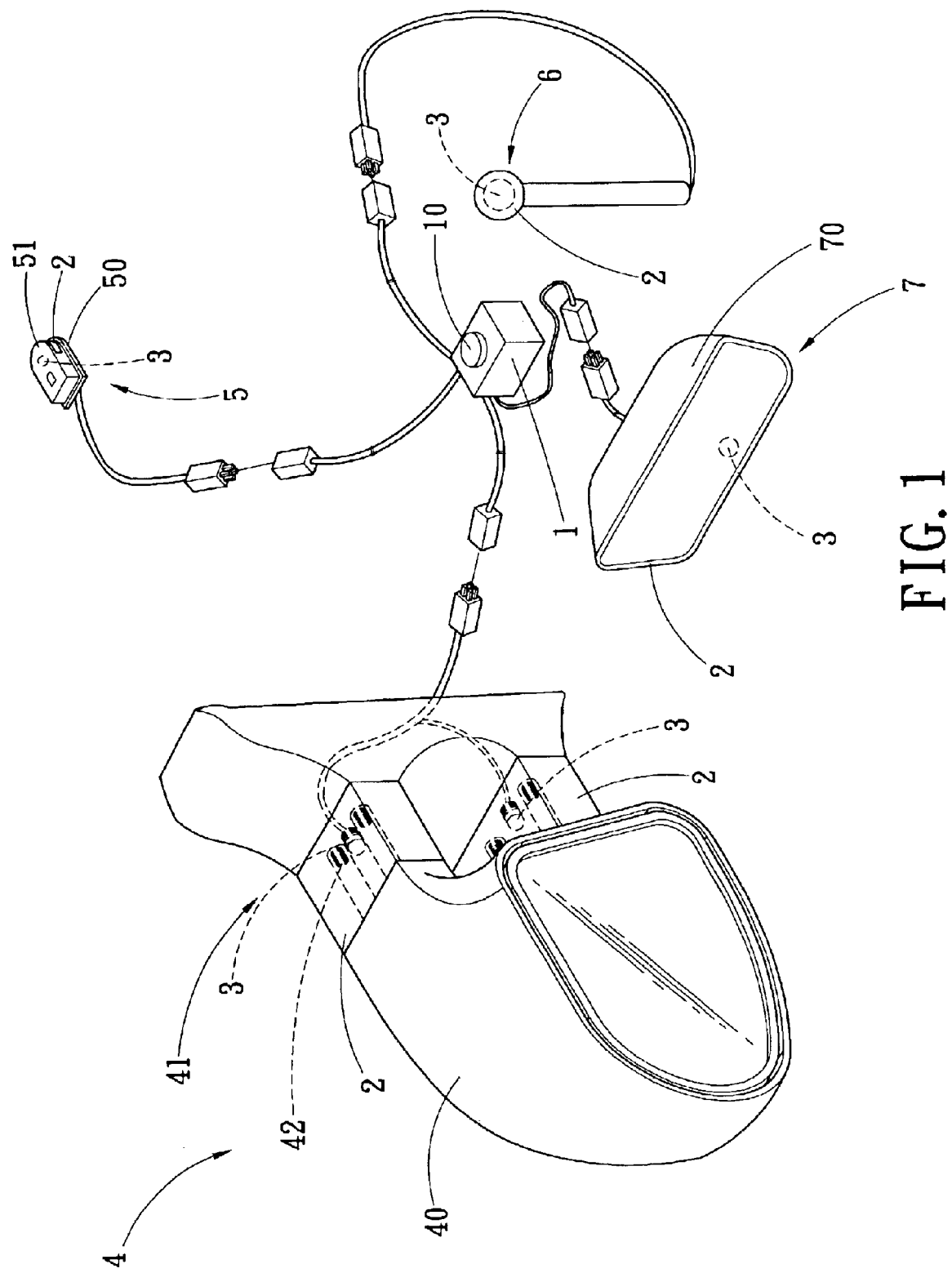
FIG. 1 is a schematic view of illustrating an electric connection of a vehicle accessory color-changing illumination assembly according to one embodiment of the invention.

Wherever possible in the following description, like reference numerals will refer to like elements and parts unless otherwise illustrated.

Figure 2:
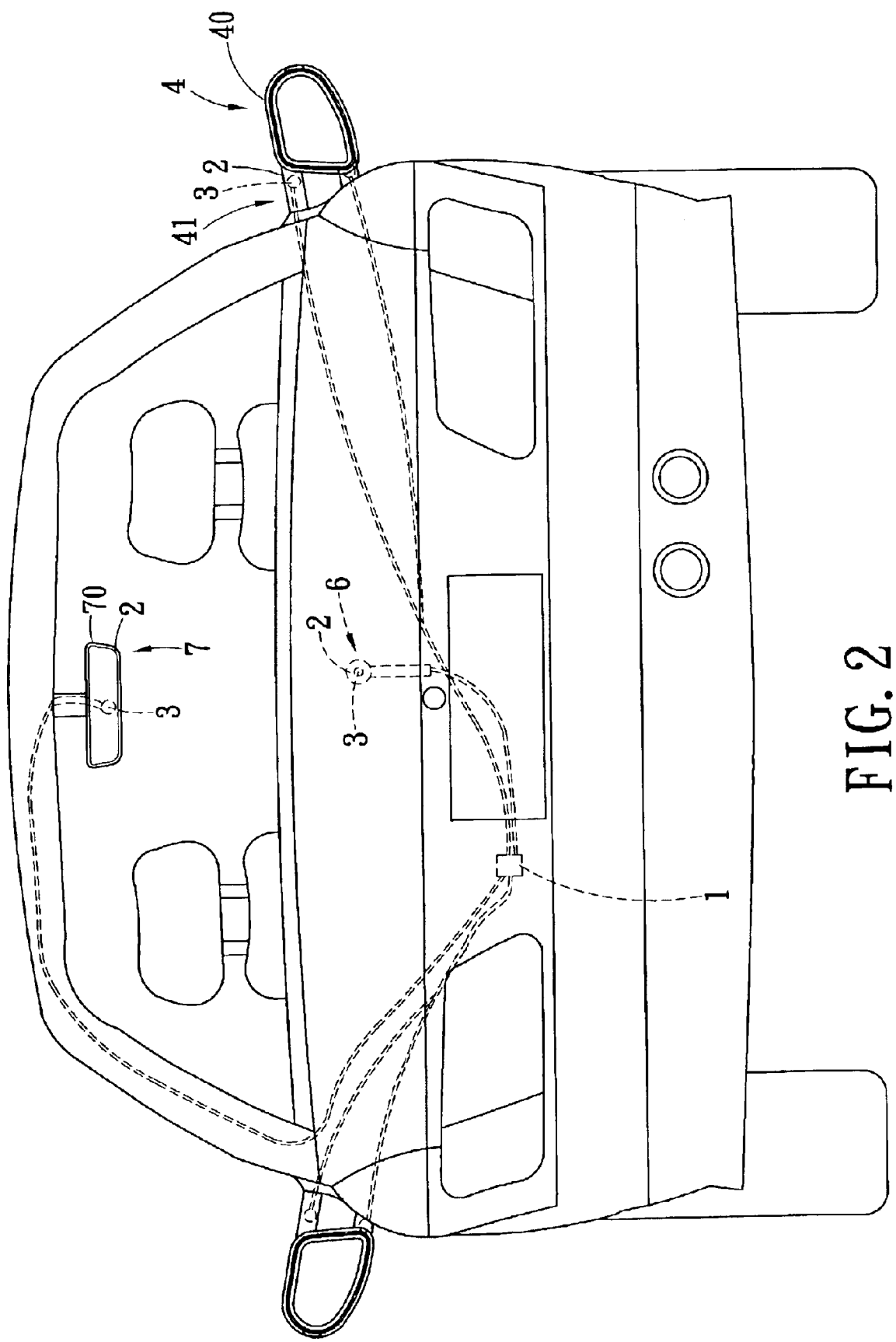
FIG. 2 is a schematic view of a vehicle accessory color-changing illumination assembly within an automotive vehicle according to one embodiment of the invention.
Figure 3:
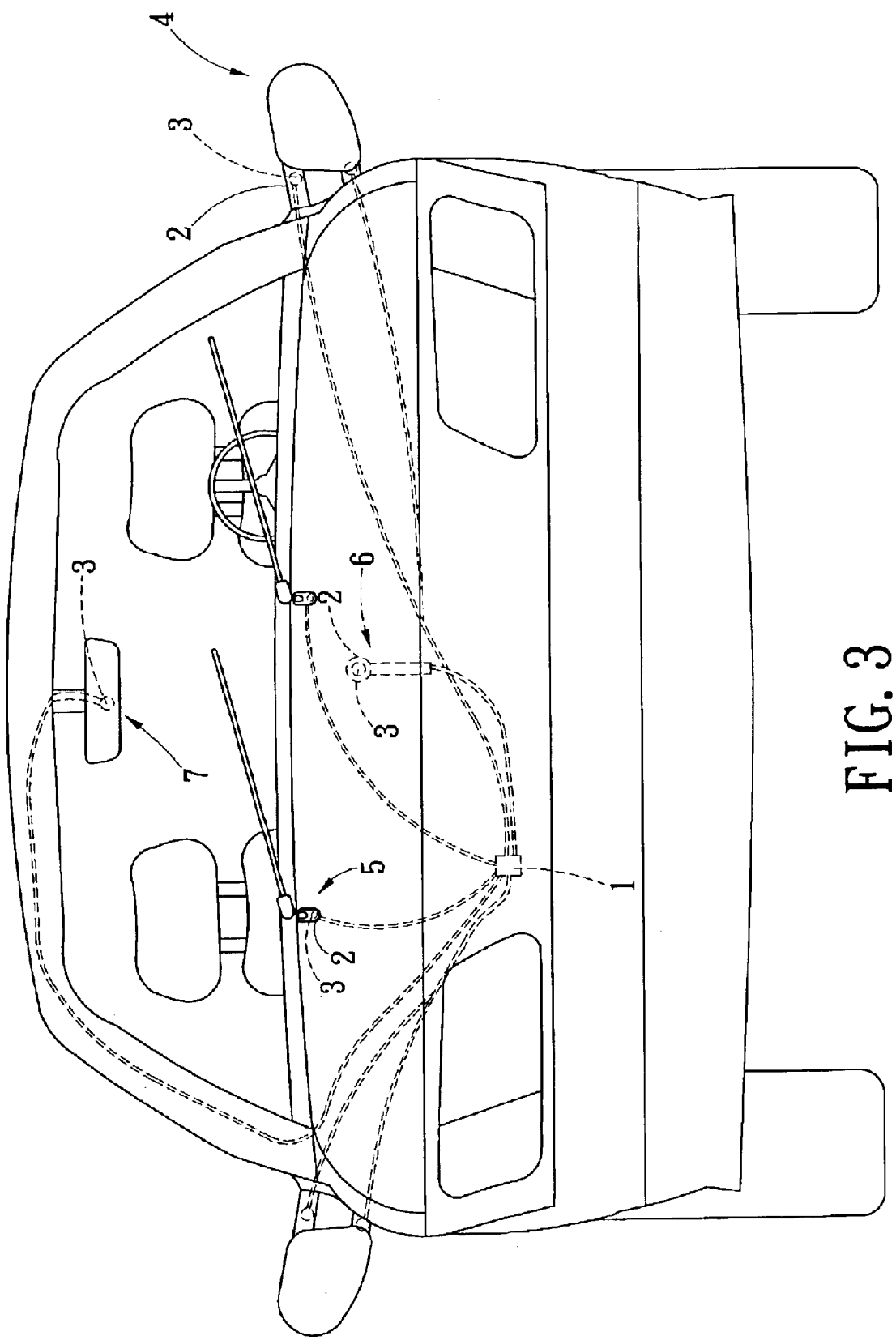
FIG. 3 is a schematic view of a vehicle accessory color-changing illumination assembly within an automotive vehicle according to one embodiment of the invention.

Referring to FIG. 1 through FIG. 3, a vehicle accessory color-changing illumination assembly of the invention includes a control box 1, a plurality of vehicle accessories and a plurality of light sources 3.

The control box 1 is provided with a control button 10 and a control circuit (not shown). The control box 1 is electrically connected to the light sources 3 and accepts 12V DC.

Each vehicle accessory, such as exterior right and left rearview mirrors 4, a liquid jet nozzle 5, a gear lever 6 and an interior rearview mirror 7, is assembled with the vehicle body and includes a transparent casing 2.

The light sources 3 are respectively mounted in each of the vehicle accessories. A control circuit for the control box 1 is electrically connected to control circuits for the light sources 3 to control a simultaneous color change of the light sources 3. The light sources 3 are, for example, light-emitting diodes (LED).

The right and left side view mirrors 4 respectively have a mirror casing 40 with an extended leg 41. Each leg 41 has a transparent casing as set forth above and a light source 3 therein. Each leg 41 is attached on the vehicle body b means of, for example, a screw fastener 42 and a bolt.

The liquid jet nozzle 5 has a base 50 mounted on the hood of the vehicle. The base 50 is formed of an upper lid 51 and one transparent casing 2. One light source 3 is mounted inside the lid 51.

The assembly of the gear lever 6 also includes one transparent casing 2 and one light source 3.

The construction of the interior rearview mirror 7 includes a frame 70. The frame 70 has one transparent casing 2 and a light source 3 therein.

Th control button 10 of the control box 1 provides a switching function of the control circuit. The control circuit controls an automatic color change of the light sources in a specified color sequence.

When the vehicle moves, the light sources 3 mounted inside each of the vehicle accessories are controlled via the control button 10 to either simultaneously radiate a single-color light such as red, blue, green, purple, water blue, yellow and white, or automatically switch between the above color lights. Different from the conventional monochromic small lighting, the color-changing illumination assembly of the invention therefore emits bright and notable warning signals through the transparent casings 2 of the vehicle accessories to help the drivers to visually evaluate and keep a safety distance from other vehicles when the vehicle is running. This may be particularly helpful when driving at high speed. Furthermore, the light source 3 inside the liquid jet nozzle 5 warns the vehicles ahead and prolongs a response time and distance if any accident happens.

In addition to improving the driving safety, the simultaneous color change of the light sources 3 inside the gear lever 6 and the interior rearview mirror provides a visual delight, increases the pleasure of driving and the aesthetic aspect of the vehicle.

As described above, the vehicle accessory color-changing illumination assembly according to the invention therefore has at least the following advantages:

1. The color change from the light sources inside the right and left side view mirrors through their transparent casing notably outlines the width of the vehicle body, especially in dark conditions, to help the driver to keep a proper safety distance between running cars and prevent traffic accidents.

2. The color change from the light sources inside the liquid jet nozzle through their transparent casing provides better warning effects to the vehicle running ahead. Thereby, the driver of the vehicle ahead can easily evaluate the distance from the vehicle behind him/her to increase the response time/distance when driving.

3. The lights from the light sources inside the gear lever and the interior rearview mirror and the lights from the external right and left rearview mirrors and the liquid jet nozzle simultaneously change color with a 7-color configuration. In addition to providing better warning effects, the color change of the light from the light sources further increases a visual aesthetic of the vehicle interior and contributes to the driving pleasure.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A vehicle accessory color-changing illumination assembly, comprising
    a control box, provided with a control button and a control circuit;
    a plurality of vehicle accessories, wherein each of the vehicle accessories is assembled on a vehicle body and includes a transparent casing; and
    a plurality of light sources, respectively mounted inside the vehicle accessories, wherein the control circuit of the control box is electrically connected to control circuits of the light sources to control simultaneous color changes of the light sources.

2. The assembly of claim 1, wherein the vehicle accessories include a right and left side view mirrors that respectively have a mirror casing with an extended leg, each extended leg having one transparent casing and one light source therein, the leg being attached on the vehicle body through a screw fastener.

3. The assembly of claim 1, wherein the vehicle accessories include a liquid jet nozzle that has a base mounted on a hood of the vehicle, the base being formed of an upper lid and one transparent casing, one light source being mounted inside the lid.

4. The assembly of claim 1, wherein the vehicle accessories include a gear lever, the gear lever having one transparent casing and one of the light sources therein.

5. The assembly of claim 1, wherein the vehicle accessories include an interior rearview mirror that has a frame, the frame having one transparent casing and one of the light sources therein.

6. The assembly of claim 1, wherein control button of the control box provides a switching function of the control circuit, the control circuit controlling an automatic and simultaneous color change of the light sources in a specified color sequence.

7. The assembly of claim 1, wherein the light sources are LEDs.

8. The assembly of claim 1, wherein the control box is electrically connected to the light sources and accepts 12V DC.

* * * * *